ations for the compatibilizing agents compared with the more traditional graft copolymers are that they involve simple synthesis and the proportion of the constituent polymers can be varied within very wide limits and in a reproducible manner.

United States Patent [19]
Buckman et al.

[11] Patent Number: 5,478,892
[45] Date of Patent: Dec. 26, 1995

[54] POLYMER BLENDS AND COMPATIBILIZERS

[75] Inventors: Alfred J. P. Buckman, Hertogenbosch; Denis G. H. Ballard, Littleton, both of Netherlands

[73] Assignee: Zeneca Limited, London, England

[21] Appl. No.: 295,626

[22] PCT Filed: Feb. 26, 1993

[86] PCT No.: PCT/GB93/00401

§ 371 Date: Aug. 24, 1994

§ 102(e) Date: Aug. 24, 1994

[87] PCT Pub. No.: WO93/17064

PCT Pub. Date: Sep. 2, 1993

[30] Foreign Application Priority Data

Feb. 28, 1992 [GB] United Kingdom ............... 9204275

[51] Int. Cl.⁶ .................... C08G 81/02; C08L 67/04; C08L 23/02
[52] U.S. Cl. .................... 525/299; 525/309; 525/78; 525/79; 525/80; 525/92 R
[58] Field of Search .............. 525/299, 309, 525/79, 80, 78, 92

[56] References Cited

U.S. PATENT DOCUMENTS

| 4,880,592 | 11/1989 | Martini | 264/514 |
| 5,135,966 | 8/1992 | Chatterjee | 523/126 |
| 5,231,148 | 7/1993 | Kleinke | 525/450 |

FOREIGN PATENT DOCUMENTS

| 340566 | 11/1989 | European Pat. Off. . |
| 417828 | 4/1991 | European Pat. Off. . |
| 435435 | 7/1991 | European Pat. Off. . |
| 459560 | 12/1991 | European Pat. Off. . |

Primary Examiner—Joseph L. Schofer
Assistant Examiner—I. Zemel
Attorney, Agent, or Firm—Cushman Darby & Cushman

[57] ABSTRACT

Blends of biodegradable polymers of hydroxybutyric acid and polyolefines of improved properties are produced by incorporating a compatibilising agent which comprises a block copolymer in which at least half of the mass of one block is represented by alkyl side chains and at least half of the mass of another block is represented by side chains which comprise hydroxy acid residues.

16 Claims, No Drawings

POLYMER BLENDS AND COMPATIBILIZERS

POLYMER BLENDS AND COMPATIBILISERS

It is known to blend polymers of different types in order for example to obtain plastics compositions possessing a combination of their properties. However, when the polymers are of dissimilar chemical composition they may be incompatible and such blends may possess poor mechanical properties due to localised segregation of the polymers and weak bonding at the interfaces between regions of different polymer composition. The problem is particularly acute when films are to be formed by a process which comprises stretching a sheet or film to reduce its thickness. This may be carried out in one, or in two substantially perpendicular directions in order for example to achieve axial or biaxial orientation of the film. Blends of polyolefins and polyesters are prone to such problems.

It is desirable to achieve films which are readily biodegradable, as these can be used for example as components of disposable diapers, ostomy bags and even as ordinary wrappings with a reduction in problems of disposal after use.

Very satisfactory biodegradable polymers comprise hydroxybutyrate groups (PHB polymers) especially those PHB polymers which also comprise hydroxyvalerate groups (PHB/PHV copolymers). Polymers of this type are described in for example our European Patents 52,459 and 69,497. However, although they can be formed into satisfactory films with care, when used alone there is a tendency with such polymers to produce a proportion of off-specification material and the manufacturing process is subject to considerable constraints. It is desirable therefore to devise improved polymer compositions of this type.

We have found that blends of such polymers with polyolefins possess favourable properties provided that the components are rendered compatible. Polypropylene is particularly favourable and has the advantage that it degrades more readily than polyethylene especially if no antioxidants are present. It is however difficult to render these materials compatible with PHB polymers.

We have found that such blends can be made with unexpectedly good properties by incorporating into them a compatibilising agent which comprises a block copolymer in which in at least one block (Block A) at least half of the mass of the block is represented by alkylene or preferably alkyl side chains, which preferably have straight chains and which are suitably at least five and preferably at most 20, for example six to twelve carbon atoms long, and in which in at least one other block (Block B) at least half and preferably at least 70% of the mass of the block is represented by side chains which comprise hydroxybutyric acid residues and optionally also other hydroxyalkanoate residues which are preferably hydroxyvalerate residues.

Preferably at least half of the units of the side chains are hydroxybutyric acid residues and any remaining units of said side chains consist essentially of hydroxyvalerate units. These side chains are suitably of average molecular weight 100–80,000 and preferably 200–10,000. The mass ratio of Block A to Block B is preferably 1:5 to 5:1.

This invention comprises said compatibilising agents and also polymer blends compatibilised with them. These agents are believed to be useful as compatibilisers in polyolefin/polyester blends generally.

Block A may derived from a polymerisable olefinically unsaturated monomer (preferably a methacrylic or acrylic monomer) having a moiety linked to the polymerisable olefinically unsaturated bond which is or includes a hydrocarbyl group of at least 5 carbon atoms (preferably at least 7). The alkyl or alkenyl groups of Block A are usually part of a larger grouping such as alkyl (or alkenyl) ester or alkyl (or alkenyl) ether groups, and will be spaced from the polymerisable olefinically unsaturated double bond by an intermediate chemical species; typical spacer groups are ester groups and ether groups. With regard to the olefinically unsaturated monomer providing block A, the upper limit for the number of carbon atoms in the hydrocarbyl group is not critical but for practical purposes will usually be about 22 (more usually about 15). The use of less than 5 carbon atoms in the hydrocarbyl group tends to result in poor compatibilisation. (The monomer may of course also possess a hydrocarbyl group(s) of less than 5 carbon atoms in addition to the hydrocarbyl group of >5 carbon atoms). The olefinically unsaturated monomer is preferably a methacrylic or acrylic monomeric species, the polymerisable unsaturated bond being provided by the double bond of a methacrylic group $CH_2{\uparrow}C(CH_3)$— or the double bond of an acrylic group $CH_2{\uparrow}CH$—. More preferably the monomer providing block A is an ester of methacrylic acid or acrylic acid of formula $CH_2{\uparrow}CR^1CO_2R^2$ where $R^1$ is methyl or H and $R^2$ is an alkyl, cycloaolkyl or aryl group of at least 5 carbon atoms, more preferably at least 7 carbon atoms (usual ranges being 5 to 20 and 7 to 15 carbon atoms). Examples of such monomers include n-octyl methacrylate, 2-ethylhexyl methacrylate, n-decyl methacrylate, lauryl methacrylate, cyclohexyl methacrylate, and docosanyl methacrylate (and the corresponding acrylate compounds). n-Octyl methacrylate and 2-ethylhexyl methacrylate are particularly preferred.

The compatibilising agent may comprise a copolymer comprising at least one block of poly alkyl acrylate or poly alkyl methacrylate units (suitably of molecular weight 10,000–200,000 and preferably 20,000–200,000) and at least one block which comprises acrylate or methacrylate units of which a substantial proportion for example 20 to 100% are esterified to hydroxyacid chains as aforesaid. The compatibilising agent may be made by reacting a copolymer reactant comprising at least one block which comprises a poly primary alkyl acrylate or methacrylate and at least one block which comprises tertiary alkyl acrylate or methacrylate or acrylic or methacrylic acid units with a polymer comprising hydroxyacid units as aforesaid, for example a PHB polymer. This may be carried out by heating the two polymers together optionally in the presence of a catalyst, for example an acid catalyst and optionally in the presence of a solvent. On heating, an olefin or alcohol corresponding to the tertiary alkyl group is also formed. The block containing the tertiary alkyl group acrylate or methacrylate units may also comprise other more stable acrylate or methacrylate ester units for example those of lower alkyl groups for example C to $C_3$ primary or secondary alkyl groups, if desired.

The copolymer reactant may be made according to the procedures of our European Patent Application No 434,316 and UK Patent Application 8929024.1 from which the said European Patent Application claims priority the disclosures of which are incorporated herein by reference.

The polymer blend may be made by contacting the polyolefine, PHB polymer and a copolymer reactant at an elevated temperature sufficient to form the compatibilising agent and to melt the components under mixing conditions, for example at a temperature of 190° C. optionally in an extruding process.

It may also be made by preforming the compatibiliser or optionally a mixture of the compatibiliser with a PHB polymer by reacting the copolymer reactant with PHB polymer, and contacting the product with the polyolefin.

The polymer blend is preferably conditioned by holding it for at least 10 seconds and suitably 20 seconds to 1 minute at a temperature of 40° to 70° C. after formation at a higher temperature.

The polyolefin is preferably blended as a high surface area polypropylene powder made by a gas phase process.

EXPERIMENT

A three necked 500 ml flask, equipped with mechanical stirrer and pressure equalised dropping funnel and a rubber septum is flame dried under vacuum to remove all air and moisture. The flask is filled with dry nitrogen and cooled in an ice/salt bath to 0° C. 120 ml toluene (distilled over sodium) is syringed into the flask. While stirring at 0° C. 1.8 ml triisobutyl aluminum solution (molar in toluene) and 0.35 ml of tButyl lithium (1.7 molar in hexane) is syringed into the flask, thus constituting an initiator solution.

20 ml toluene and 1.2ml of the above triisobutyl aluminum solution and 30 ml octylmethacrylate (dried on silica column) are premixed in the dropping funnel and then slowly added to the flask containing the initiator solution. The temperature is kept at 0° C. and the polymerisation is allowed to go to completion over a period of three hours.

Then 20 ml toluene and 6 ml t-butylmethacrylate and 6 ml methyl-methacrylate and 0.6 ml of the above triisobutyl aluminum solution are premixed and added to the flask which contains the octylmethacrylate polymer. The flask is stirred for another 3 hours and then the polymerisation is terminated by adding 0.2 ml water, thus forming a copolymer comprising an poly octyl methacrylate block and a random t-butyl/methyl methacrylate block.

Work Up

The copolymer is precipitated from its solution in toluene by addition to a solution of 10% by weight HCl in methanol. The polymer is filtered off and dried in a vacuum oven at 80° C. for 4 hours. The yield of copolymer is 98% of the monomers fed.

The calculated number average molecular weight is 175000. The number average molecular weight determined by gell permeation chromatography (GPC) is 40000. The number average (Mn) to mass average (Mw) molecular weight Mn/MW was 1.3. Polyoctylmeth-acrylate is known to come out of GPC showing much lower Mn than real Mn. This is because the GPC was calibrated for polymethyl methacrylate only.

Grafting of PHB/PHV Copolymer

Method 1

Dissolve octymethacrylate methylmethacrylate/tbutylmethacrylate block copolymer as produced above (20 g) in 250 ml toluene and add 2.5 g paratoluenesulphonic acid monohydrate. Also add 20 g PHB/PHV copolymer (88% PHB/12% PHV molar) powder. Reflux this mixture in a flask fitted with a reflux condenser at atmospheric pressure for 70 hours under nitrogen. Precipitate with methanol to give a white polymer powder. (Residual degraded PHB/PHV copolymer is soluble in methanol).

Method 2

As an alternative to the previous method of grafting mix the PHB/PHV copolymer with the octylmethacrylate/methylmethacrylate/t-butylmethacrylate block copolymer (1 to 5% by weight based on the PHB/PHV copolymer). Extrude this mixture at 190° C. in a single screw extruder. The extrusion cleaves the tbutyleeter to give butene and free acid groups, which can react with the thermally degrading PHB/PHV copolymer to give the required graft copolymer.

Preparation of Polypropylene/PHB/PHV Copolymer Composites with Compatibiliser The required amount of compatibiliser was dissolved in 100 ml of toluene and added to the polypropylene powder. This was stirred for 2 hours to allow the compatibiliser to absorb onto the polypropylene. (The toluene helps by swelling the polypropylene amorphous regions). The toluene is then removed on a rotary evaporator and the polypropylene is dried in a vacuum oven for 2 hours at 80° C. PHB/PHV copolymer powder is added to the polypropylene. All blends were prepared on a total weight of 1 kg after addition of all components. The blends were then extruded into pellets using a single screw extruder at 190° C.

The following table shows test results of the composites.

TABLE 1

Blends of PHB/PHV Copolymer and Polypropylene (equal weight) with different amounts of compatibiliser

|  | Compatibiliser % by weight | Unnotched Izod Impact test J/mm² × 10³ | Stress at Break MPa (mega pascals) | Young's Modulus MPa ≡ N/mm² |
| --- | --- | --- | --- | --- |
| PP#/BP** | 0 | 2.67 | 17.6 | 1414 |
| PP#/BP** | 2 | 6.52 | 24.4 | 1393 |
| PP#/BP** | 3 | 5.05 | 21.0 | 1321 |
| PP# |  | * | 37.6 | 1301 |
| BP** |  | 5.35 | 23.2 | 2219 |

* - out of range; ** - PHB/PHV Copolymer; # - Polypropylene.

Tests on Films

A compression moulded plaque of composite is drawn to approximately 8 times its original length and width at about 50° C. Films were made of a 75% Polypropylene 25% PHB/PHV copolymer by weight composition containing 1% of the compatibiliser. The samples were very easily drawn into films, compared with pure PHB/PHV copolymer.

The tensile properties of this sample were tested in both orientation directions and compared to pure PHB/PHV copolymer 25 film (Table 2). The film felt very strong.

TABLE 2

Tensile Properties of 75/25 Composite compared to Biaxially oriented PHB/PHV Copolymer

|  | Composite Horizontal | Composite Vertical | PHB/PHV Copolymer biaxially oriented |
| --- | --- | --- | --- |
| Stress at peak MPa | 65 | 72 | 34 |
| Stress at break MPa | 65 | 72 | 33 |
| Young modulus MPa | 1170 | 1270 | 249 |

We claim:

1. A compatibilising agent which comprises a block copolymer in which in at least one block (Block A) at least half of the mass of the block is represented by alkylene or alkyl side chains and in which in at least one other block (Block B) at least half of the mass of the block is represented by side chains which comprise hydroxybutyric acid residues and optionally also other hydroxyalkanoate residues.

2. A compatibilising agent as claimed in claim 1 in which at least half of the units of the side chains of Block B are hydroxybutyric acid residues and any remaining units of the side chain consist essentially of hydroxyvaleric acid residues.

3. A compatibilising agent as claimed in claim 1 or 2 in which the mass ratio of Block A to Block B is in the range 5:1 to 1:5.

4. A compatibilising agent according to claim 1 in which the main chain is a polyacrylic or methacrylic acid chain and the side chains are attached by ester linkages.

5. A compatibilising agent according to claim 1 wherein the alkylene or alkyl side chains in Block A are straight chains of at least 5 carbon atoms in length.

6. A compatibilising agent according to claim 5 wherein the alkylene or alkyl side chains in Block A are at most 20 carbon atoms long.

7. A compatibilising agent according to claim 6 wherein the alkylene or alkyl side chains in Block A are 6 to 12 carbon atoms in length.

8. A compatibilising agent according to claim 1 wherein at least 70% of Block B is represented by said side chains.

9. A compatibilising agent according to claim 8 wherein the other hydroxyalkanoate residues in Block B are hydroxyvalerate residues.

10. A process of making a compatibilising agent as claimed in claim 1 which comprises reacting together a polyhydroxyalkanoic acid and a block copolymer of a primary alkyl acrylate or methacrylate with a tertiary alkyl acrylate or methacrylate or acrylic or methacrylic acid.

11. A process as claimed in claim 10 in which the polyhydroxyalkanoic acid comprises at least 50% of hydroxybutyric acid units.

12. A process as claimed in claim 10 or 11 in which the reaction takes place in the presence of a polyolefine at an elevated temperature sufficient to melt the polyolefine under conditions of mixing.

13. A composition which comprises a polyolefine, a PHB polymer and a compatibilising agent as claimed in claim 1.

14. A composition as claimed in claim 13 in which the mass ratio of polyolefine to PHB polymer is 1:5 to 5:1 and in which 0.5 to 10% by weight of the compatibilising agent is present.

15. A draw-oriented article which comprises a composition as claimed in claim 13 or 14.

16. A composition according to claim 14 wherein from 1 to 5% by weight of the compatibilising agent is present.

* * * * *